Feb. 17, 1970  W. W. JENSEN  3,495,845
CART FOR TRANSPORTING REFRIGERATED PRODUCE
Filed Dec. 27, 1967

INVENTOR.
WALTER W. JENSEN
BY
ATTORNEYS

United States Patent Office 3,495,845
Patented Feb. 17, 1970

3,495,845
CART FOR TRANSPORTING REFRIGERATED
PRODUCE
Walter W. Jensen, 617 Florence Road,
River Vale, N.J. 07675
Filed Dec. 27, 1967, Ser. No. 693,811
Int. Cl. B26b 3/00
U.S. Cl. 280—79.2                 6 Claims

ABSTRACT OF THE DISCLOSURE

A cart for transporting refrigerated produce is provided with a front wall of a lower height than the produce supporting side walls. As a result the level of the water, caused by condensation dripping from the produce into the cart, is always maintained below the level at which the produce is carried, thereby preventing wetting and contamination of the produce.

BACKGROUND OF THE INVENTION

This invention relates generally to a cart or dolly, and particularly to a cart for carrying and transporting refrigerated food produce, such as poultry and meat, from an area of refrigeration through an area of elevated temperatures wherein moisture condenses on the surface of the refrigerated produce.

At the present time most of the meat and chicken produce is distributed to the consumer through large supermarkets. These supermarkets generally include separate meat and poultry sections wherein the produce is displayed to the consumer in refrigerated display cases.

The produce is generally brought to the supermarket in large refrigerated trucks from which the refrigerated produce is transported on carts to a refrigerated area in the supermarket. During the trip from the truck to the storage area, the refrigerated produce is carried through areas of warmer temperatures.

Once the produce has been carried into the supermarket, it is usually cut to marketable portions, weighed and packaged. When poultry is to be sold, the poultry is often brought to the supermarket already packaged in a transparent plastic wrapping. All that need be done to the packaged poultry is the placing of the store label and the price on the wrapping. Here too, there is the need for carrying the produce on a cart from a refrigerated area through and to a non-refrigerated environment. Often the produce will remain on the cart in the non-refrigerated area for long periods of time while the package is being handled prior to the placing of the package into the refrigerated display case.

In the moving of the refrigerated produce from the refrigerated area to and through the warmer non-refrigerated areas, moisture will condense on the cold surface of the produce or on the wrapping in which the produce is packaged. When a sufficient amount of moisture has thus developed, water droplets will begin to fall into the interior of the cart on which the produce is being carried and/or moved. As there may be a great amount of produce carried on the cart and as the cart may remain in a warm area for a considerable length of time, the amount of water falling into the cart may become substantial.

Carts previously utilized to transport refrigerated produce generally required the use of a number of flat pans placed in the cart to receive the water falling from the produce. In other forms of the known carts, the water fell directly into the bottom of the cart. In the former arrangement, the individual pans had to be removed from the cart and separately emptied; while in the latter arrangement, the entire cart had to be tipped over to remove the collected water supply. In either case, the removal of water is cumbersome, time consuming and generally results in the undesired spilling of water.

A more significant problem associated with the known carts is the ever present danger that the level of collected water within the cart might rise to a level at which the water would contact the produce carried by the cart, thereby causing the produce to become wet. This wetting of the produce could possibly contaminate the produce, and would very likely alter the consistency and taste of the produce.

The possibility of wetting the refrigerated produce during the carting of the produce through non-refrigerated areas increases when the front end of the cart is tilted so that the cart may be carried over thresholds, curbs, steps and the like. When the front section of the cart is tilted upwards, the water level at the rear of the cart will rise and approach the level at which the produce is carried. Once again this will cause wetting and possible contamination of the produce.

It is thus highly desirable that the problems associated with the use of the known produce carrying carts be overcome by means of an economical and yet reliable and rugged cart construction.

Accordingly, it is the primary object of the present invention to provide an improved produce carrying cart adapted for transporting refrigerated produce into areas of non-refrigerated temperatures.

It is another object of the present invention to provide an improved produce carrying cart wherein the refrigerated produce being carried thereon always remains separated from the water falling into the cart due to condensation of moisture on the produce, thereby preventing wetting of the produce.

It is yet another object of the present invention to provide an improved construction of a produce carrying cart wherein the water collecting in the cart may be easily removed, without unwanted spilling of the water.

It is also an object of the present invention to provide an improved produce carrying cart wherein separate, removable water collecting means are not requiried.

It is a general object of the present invention to provide an improved producer carrying cart wherein the level of the collected water in the cart is maintained below the level at which the produce is being carried.

It is yet a further object of the present invention to provide an improved produce carrying cart wherein one end of the cart may be raised to facilitate the movement of the cart over raised obstructions, without the danger of the collected water in the cart reaching the level of the carried produce.

It is yet a further object of the present invention to provide a produce carrying cart which can be tilted to facilitate movement over raised obstructions without the water therein spilling out until a maximum water level is reached.

SUMMARY OF THE INVENTION

In carrying out the invention in one form, an improved produce carrying cart is provided having a bottom, and front, rear and opposing side walls extending upwardly from the bottom. The side walls are of substantially the same height and the height of the side walls is significantly greater than that of the front wall. Means are provided for supporting the refrigerated produce near the upper portion of the side walls. The maximum level to which water, dripping from the produce into the trough-like container defined by the bottom and the side, front and rear walls' rises is limited by the height of the front wall when the cart is moving over substantially level ground. If the water level exceeds the height of the front wall, the water will spill over the front wall. Therefore, the produce supported at the upper portion of the side walls lies well above this maximum water level. The produce will, therefore, not be wettened by the water regardless of the amount of water falling into the cart, and the period of time during which the produce is left in an area of non-refrigerated or room temperatures.

In a further aspect of this invention, the height of the rear wall is made greater than that of the front wall but less than that of the side walls. As a result, when the front end of the cart is tilted upwardly to move the cart over elevations, the rear wall retains the water within the cart, while still preventing the water in the rear of the cart from reaching the level of the produce.

The present invention further provides a spout located in the bottom which may be opened to permit the water, which has collected in the cart, to flow out from the cart at a preselected location and in a controlled manner.

The subject matter which is regarded as the invention is particularly pointed out and distinctly claimed in the concluding part of the specification. The invention, itself, both as to its organization and method of operation, together with further objects and advantages thereof may be best understood by reference to the following description taken in connection with the accompanying drawing.

DESCRIPTION OF THE PREFERRED EMBODIMENT

Figure 1:
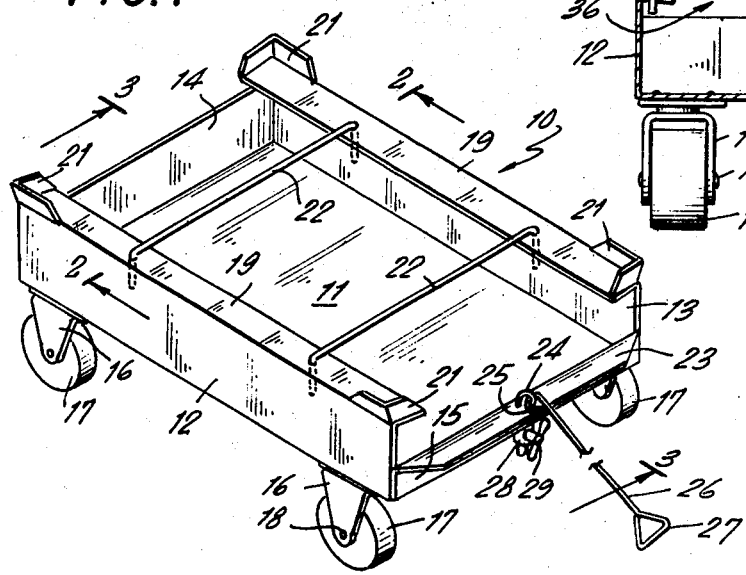
FIGURE 1 is a perspective view of a produce carrying cart embodying a preferred embodiment of the present invention.

Turning now to the drawing in more detail, one preferred embodiment of the present invention is illustrated showing a produce carrying cart which is specially suited for transporting refrigerated produce from a refrigerated zone to an area at normal room non-refrigerated temperature.

With particular reference to FIG. 1, the cart 10 of this invention includes a trough-shaped container or tray portion formed of a single piece of sheet metal, having a bottom 11. A pair of upstanding and opposed side walls 12 and 13, of substantially the same height extend substantially perpendicularly from bottom 11. Also extending upwardly from bottom 11 are a rear wall 14 and a front wall 15.

Figure 2:
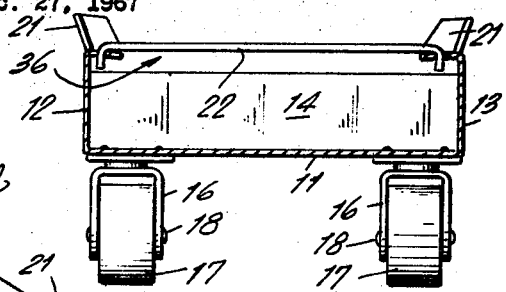
FIGURE 2 is a section viewed in the direction of the arrows 2—2 of FIG. 1.

Four wheel supporting yoke members 16 are secured by means such as welding near the corners of the underside of bottom 11. Wheels 17 are rotatably mounted on axles 18, which are in turn secured to the opposing sections of the yoke members 16, as shown best in FIGURE 2.

Each of the side walls 12 and 13 is bent inwardly at the upper ends thereof to form shelf sections 19 extending towards one another. Shelf sections 19 extend substantially horizontally, but may be further bent downwardly until the shelf sections 19 extend approximately 5° below the horizontal. Four L-shaped corner brackets 21 are secured by any suitable means, such as welding, at each end of the shelf sections 19. The apex of each bracket 21 is located at the outer corners of the shelf sections 19 as shown in FIGURE 1. At approximately one-quarter of the distance from each of the ends of shelf sections 19, holes are provided to receive therein the bent end portions of parallel support rods 22. In this manner rods 22 are secured to the cart 10 and extend between the two shelf sections 19.

Front wall 15 is provided with an outwardly extending horizontal ledge 23 upon which an anchoring eye 24 is secured. Eye 24 is adapted to receive a hooked end portion 25 of an elongated pull rod 26. Rod 26 is further provided with a triangular handle 27 at its other end, which is held by the person pulling the cart.

Centrally located at the front end of bottom 11 is a draining spout 28 having a valve member operated between an open and a closed position by means of a wing nut control member 29.

In accord with one aspect of the present invention, the height of the side walls 12 and 13 is greater than the height of the front wall 15. In a preferred embodiment of this invention, the height of the side walls 12 and 13 is slightly greater than twice that of the front wall 15. In accord with another significant feature of the present invention, the height of the side walls 12 and 13 is also greater than the height of the rear wall 14 as shown best in FIGURE 2. The reasons for these features of the present invention are now explained with particular reference to FIGURES 3 and 4.

Figure 3:
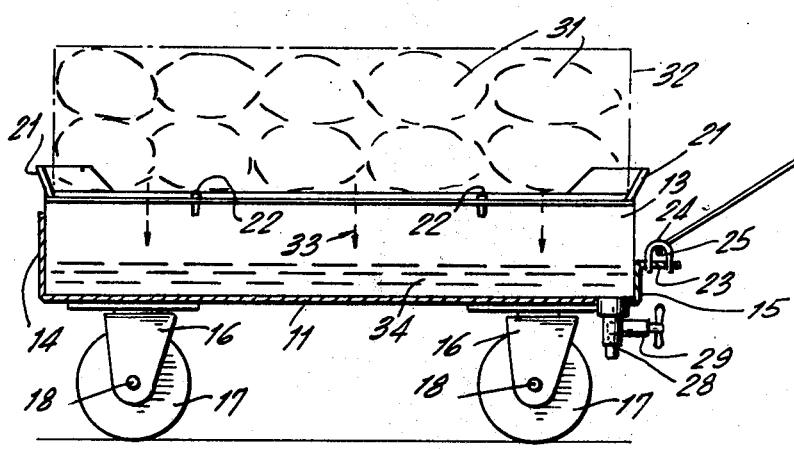
FIGURE 3 is a section viewed in the direction of the arrows 3—3 of FIG. 1 also showing a load of produce carried on the cart of the present invention.
Figure 4:
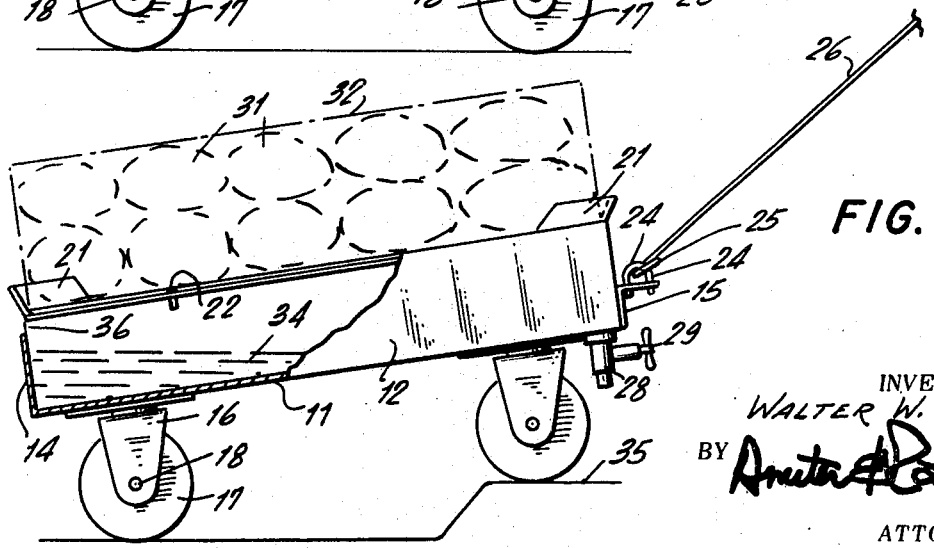
FIGURE 4 is a view of the cart of FIG. 1 shown partly in section and carrying a load of produce, the front end of the cart being raised to enable the cart to pass over an obstruction.

FIGURES 3 and 4 further illustrate the manner in which the present invention is utilized to transport a load of refrigerated product, such as poultry or beef. The product 31 is placed within a perforated container 32. The four corners of container 32 are placed within the corner brackets 21 and the container 32 is further supported by the parallel rods 22 and the shelf sections 19.

When the refrigerated produce 31 is carried from a refrigerated zone, such as a refrigerated truck or storage room, through an area of elevated temperature, moisture condenses on the cold surfaces of the produce. When sufficient moisture is thus formed, drops of water begin to fall from produce 31 into the cart 10, as indicated by the arrows 33 in FIGURE 3. After droplets have fallen over a sufficient period of time, an accumulation of water 34 collects within the cart 10.

In the known produce carrying carts, the water may accumulate to a level at which a portion of the produce itself may become immersed therein, thereby causing wetting and possible contamination of the produce. This occurrence is averted by the present invention as the level of the water 34 within the cart is limited by the height differential between front wall 15 and the side walls 12 and 13. When the water level reaches the height of the front wall 15, the excess water will merely spill over front wall 15 and ledge 23 onto the surrounding floor area. As the lowest portion of the container 32 is carried by the rods 22 and the shelf sections 19 which are in turn carried at the upper portions of side walls 12 and 13, there is clearly no danger of the produce 31 coming into contact with the water 34 within the cart.

The above discussion assumes that the produce cart 10 is being moved along a substantially level floor. When, however, as shown in FIGURE 4, the front end of the cart must be raised or tilted in order to move the cart over an obstruction in the path of the cart such as the curb 35, the level of the water in the rear of the cart increases and approaches the underside of container 32. Because of the relatively great height of the rear wall 14 as compared to the height of the front wall 15, the water will be retained within the interior of the cart, until the water level rises further and spills over the top of the rear wall 14 through the gap 36. As described above, the height of the rear wall 14 is less than that of the height of the side walls 12 and 13 to thereby define the gap 36 between the top of the rear wall 14 and the upper ends of the side walls 12 and 13, as seen best in FIGURE 2.

A further consequence of the provision of the gap 36 between the top of rear wall 14 and the upper ends of the side walls 12 and 13, is that the water retained within cart 10 will spill over the rear wall 14 when the front end of the cart is tilted before the water comes into contact with the produce 31. As explained above, this avoids the problem of wetting and the possible contamination of the produce by the water.

The known produce carts generally must be provided with flat pans to catch the accumulated condensation. These pans must be periodically removed and emptied of their water. In contrast to this, the produce carrying cart of the present invention may be readily emptied of its collected condensation water 34 by simply opening spout 28 at a desired location, to allow the water within the cart 10 to flow out into any convenient reservoir (not shown). This procedure is certainly more convenient and neater than that required by the use of the collecting pans in the prior art carts.

What is claimed is:

1. A wheeled cart for transporting cases of low temperature food comprising, in combination, a body having a bottom wall, two side walls, a front and a rear wall, all formed of solid sheet metal, said walls defining a water-retaining compartment, a discharge valve operatively located in said water-retaining compartment for discharging water collected in said compartment, roller means connected to said body for movably supporting the cart above the ground, means attached to said body at said front wall for pulling and guiding same along the ground, said front wall being of a first height and defining a maximum height for liquid within said water-containing compartment, said side walls being of a higher height, and support means at the upper edges of said side walls at a level above the level of the maximum height of liquid within said water-retaining compartment.

2. A wheeled cart in accordance with claim 1 wherein said rear wall is of a height greater than said front wall and not higher than said side walls for retaining liquid in said water-retaining compartment.

3. A cart for carrying and transporting produce comprising a bottom, a pair of opposed side walls, a rear wall, and a front wall, each of said walls extending upwardly from said bottom, said walls and said bottom defining a water retaining compartment; means associated with said front wall for retaining water within said compartment up to a first level defined by the height of said front wall and means associated with said side walls for supporting said produce at a second level defined by the height of said side walls; said side walls being greater in height than said front wall with said second level being higher than said first level whereby water contained within said compartment is always retained below said produce when said produce is placed upon said supporting means; said rear wall being greater in height than said front wall and being lower in height than said side walls wherein water will spill over said rear wall before it contacts said produce on said supporting means.

4. The cart of claim 3 wherein the height of said side walls is greater than twice the height of said front wall.

5. The cart of claim 3 wherein said supporting means comprise shelf means extending from the upper end of said side walls and rod means extending between said shelf means.

6. The cart of claim 5 wherein said support means further comprise bracket means secured to said shelf means.

References Cited

UNITED STATES PATENTS

| 946,095 | 1/1910 | Baker | 296—1 |
|---|---|---|---|
| 1,053,795 | 2/1913 | Ellis | 296—38 |
| 1,307,044 | 6/1919 | Friedrich | 296—1 |
| 1,915,173 | 6/1933 | Vieregge | 280—79.2 |

BENJAMIN HERSH, Primary Examiner

MILTON L. SMITH, Assistant Examiner

U.S. Cl. X.R.

296—38